(12) United States Patent
Savchenkov et al.

(10) Patent No.: US 7,665,891 B1
(45) Date of Patent: Feb. 23, 2010

(54) DIFFERENTIAL TEMPERATURE SENSOR SYSTEM AND METHOD

(75) Inventors: Anatoliy A. Savchenkov, Glendale, CA (US); Nan Yu, Arcadia, CA (US); Lute Maleki, Pasadena, CA (US); Vladimir S. Iltchenko, Arcadia, CA (US); Andrey B. Matsko, Pasadena, CA (US); Dmitry V. Strekalov, Arcadia, CA (US)

(73) Assignee: The United States of America as represented by the Administrator of the National Aeronautics and Space Administration, Washington, DC (US)

(*) Notice: Subject to any disclaimer, the term of this patent is extended or adjusted under 35 U.S.C. 154(b) by 307 days.

(21) Appl. No.: 11/858,318

(22) Filed: Sep. 20, 2007

(51) Int. Cl.
*G01K 11/26* (2006.01)
*G01K 1/00* (2006.01)
*G01H 1/14* (2006.01)
*G01H 3/04* (2006.01)

(52) U.S. Cl. .................. 374/117; 374/130; 374/127; 374/120; 73/579; 382/28

(58) Field of Classification Search ............ 374/100, 374/117–119, 120, 121, 127, 141, 130–131; 385/2, 8, 12; 359/308, 326, 330, 237, 238, 359/239, 240, 244, 245, 285; 73/1.77, 1.82, 73/579

See application file for complete search history.

(56) References Cited

U.S. PATENT DOCUMENTS

| | | | | | |
|---|---|---|---|---|---|
| 3,622,183 | A | * | 11/1971 | White | 285/179 |
| 4,048,499 | A | * | 9/1977 | Kreuzer | 250/344 |
| 4,529,319 | A | * | 7/1985 | Muller | 356/432 |
| 4,621,929 | A | * | 11/1986 | Phillips | 374/43 |
| 5,009,505 | A | * | 4/1991 | Malvern | 356/480 |
| 5,141,331 | A | * | 8/1992 | Oehler et al. | 374/118 |
| 5,297,156 | A | * | 3/1994 | Deacon | 372/21 |
| 5,412,474 | A | * | 5/1995 | Reasenberg et al. | 356/486 |
| 5,452,314 | A | * | 9/1995 | Aronson | 372/20 |
| 5,850,491 | A | * | 12/1998 | Morasca et al. | 385/7 |
| 6,243,506 | B1 | * | 6/2001 | Wu et al. | 385/12 |
| 6,587,202 | B2 | * | 7/2003 | Rebhan | 356/432 |

(Continued)

FOREIGN PATENT DOCUMENTS

FR    2636744 A1 *  3/1990

*Primary Examiner*—Gail Verbitsky
(74) *Attorney, Agent, or Firm*—Mark Homer

(57) ABSTRACT

A differential temperature sensor system and method of determining a temperature shift of an optical resonator and its surroundings are provided. The differential temperature sensor system includes a light generating device capable of generating a beam having a carrier frequency, a modulator capable of modulating the beam with a sideband frequency, and an optical resonator capable of supporting an ordinary mode and an extraordinary mode. The system includes an ordinary mode-lock setup capable of locking the carrier frequency of the beam to the ordinary mode of the optical resonator and an extraordinary mode-lock setup capable of locking the sideband frequency of the beam to the extraordinary mode of the optical resonator by providing a specific radio frequency to the modulator substantially corresponding to a frequency shift between the ordinary mode and the extraordinary mode of the optical resonator resulting from a temperature change of the optical resonator. A processor precisely calculates the differential temperature based upon the frequency shift between the ordinary mode and extraordinary mode of the optical resonator.

15 Claims, 2 Drawing Sheets

U.S. PATENT DOCUMENTS 7,173,754 B2 * 2/2007 Vodopyanov et al. ....... 359/330
7,274,839 B2 * 9/2007 Schweiger ................... 385/15
7,453,981 B2 * 11/2008 Baumann et al. ............. 378/62
2004/0258128 A1 * 12/2004 Johs et al. ................... 374/130
2008/0180782 A1 * 7/2008 Kump et al. ................ 359/285
2009/0135860 A1 * 5/2009 Maleki et al. ................ 372/20

* cited by examiner

DIFFERENTIAL TEMPERATURE SENSOR SYSTEM AND METHOD

STATEMENT AS TO FEDERALLY-SPONSORED RESEARCH

The invention described herein was made in the performance of work under a NASA contract, and is subject to the provisions of Public Law 96-517 (U.S.C. 202) in which the Contractor has not elected to retain title.

FIELD OF THE INVENTION

The present teachings relate to a differential temperature sensor system and a method of sensing a differential temperature. In particular, the present teachings relate to a differential temperature sensor system and method that can precisely determine a differential temperature of an optical resonator and its surroundings by comparing the change in the frequencies of the modes of the optical resonator when exposed to a temperature shift. The differential temperature sensor system can be incorporated as part of a laser frequency stabilization arrangement.

BACKGROUND OF THE INVENTION

To achieve stable operation of whispering gallery mode (WGM) resonator-based lasers, the stabilization of the frequency of its optical resonator is necessary. However, the frequency of such lasers can vary as a result of temperature changes of the optical resonator and its surroundings. In order to stabilize the frequency of optical resonators, it is known to compare their frequency and temperature with the frequency and temperature of an external etalon. However, such a comparison requires the stabilization of the frequency and temperature of the external etalon which can be very difficult and in effect just passes the problem on to the external etalon.

Accordingly, there exists a need for a simple and efficient system for precisely measuring the temperature shift or temperature differential of an optical resonator.

SUMMARY OF THE INVENTION

The present teachings provide a differential temperature sensor system including a light generating device capable of generating a beam having a carrier frequency, a modulator being driven by a radio frequency and capable of modulating the beam with a sideband frequency, and an optical resonator capable of supporting ordinary and extraordinary modes and arranged in optical communication with the beam. The system further includes an ordinary mode-lock setup capable of locking the carrier frequency of the beam to the ordinary mode of the optical resonator, and an extraordinary mode-lock setup capable of locking the sideband frequency of the beam to the extraordinary mode of the optical resonator by providing a specific radio frequency to the modulator substantially corresponding to a frequency shift between the ordinary mode and the extraordinary mode of the optical resonator resulting from a temperature change of the optical resonator. A processor can be arranged to receive the specific radio frequency and capable of calculating the differential temperature of the optical resonator based upon the frequency shift between the ordinary mode and extraordinary mode of the optical resonator.

The present teachings also describe a differential temperature sensor system including a light generating device capable of generating a beam having a carrier frequency, a tunable oscillator capable of emitting a signal including a specific radio frequency, a modulator being driven by the specific radio frequency of the tunable oscillator and arranged in optical communication with the beam such that the modulator is capable of modulating the beam with a sideband frequency, and an optical resonator capable of supporting ordinary and extraordinary modes which shift in response to a temperature change. The optical resonator can be arranged in optical communication with the beam downstream from the modulator. The system can further include a mode-lock setup capable of locking the carrier frequency of the beam to the ordinary mode of the optical resonator and a processor arranged to receive the signal from the tunable oscillator. The tunable oscillator can be arranged to receive a feedback signal related to the sideband frequency and to drive the modulator by the specific radio frequency corresponding to a frequency shift between the ordinary mode and extraordinary mode of the optical resonator resulting from a temperature change of the optical resonator when the sideband frequency is locked to the extraordinary mode of the optical resonator. The processor can be arranged to calculate the temperature differential at the optical resonator based upon the frequency shift between the ordinary mode and extraordinary mode of the optical resonator.

The present teachings further describe a method of sensing a temperature differential. The method includes providing an optical resonator capable of supporting ordinary and extraordinary modes, directing a beam into the optical resonator, the beam having a carrier frequency and a sideband frequency, locking the carrier frequency to the ordinary mode of the optical resonator, and locking the sideband frequency to the extraordinary mode of the optical resonator by modulating the beam as a function of a frequency shift between the ordinary mode and extraordinary mode of the optical resonator in response to a temperature change of the optical resonator. The method includes determining the temperature differential at the optical resonator based upon the frequency shift between the ordinary mode and extraordinary mode of the optical resonator.

The present teachings still further describe a differential temperature sensor system including a first light generating device capable of generating a first beam having a frequency $f_0$ and a second light generating device capable of generating a second beam having a frequency $2f_0+\Delta f$. A first modulator is driven by an oscillator frequency and can be arranged in optical communication with the first beam such that the modulator is capable of modulating the first beam with a first sideband frequency. A second modulator can be driven by the oscillator frequency and is arranged in optical communication with the second beam such that the modulator is capable of modulating the second beam with a second sideband frequency. An optical resonator can be provided which supports first and second modes and can be arranged in optical communication with the first beam downstream from the first modulator and the second beam downstream from the second modulator. A first mode-lock setup is capable of locking the frequency $f_0$ to the first mode of the resonator and a second mode-lock setup is capable of locking the frequency $2f_0+\Delta f$ to the second mode of the resonator. A combiner can be arranged in optical communication with a portion of the first beam and of the second beam and is capable of generating a signal corresponding to a frequency shift resulting from a temperature change of the optical resonator. A processor can be arranged to receive the signal corresponding to the frequency shift and is capable of calculating the differential temperature based upon the output frequency shift.

The present teachings describe a further method of sensing a temperature differential. The method includes providing an optical resonator capable of supporting a first mode and a second mode, directing a first beam and a second beam into the optical resonator, the first beam having a frequency $f_0$ and a first sideband frequency and the second beam having a frequency $2f_0 + \Delta f$ and a second sideband frequency, locking the first beam frequency to the first mode of the optical resonator, locking the second beam frequency to the second mode of the optical resonator, determining a frequency shift between the first locked beam frequency and the second locked beam frequency in response to a temperature change of the optical resonator, and determining the temperature differential based upon the frequency shift between the first locked beam frequency and the second locked beam frequency.

Additional features and advantages of various embodiments will be set forth, in part, in the description that follows, and will, in part, be apparent from the description, or may be learned by the practice of various embodiments. The objectives and other advantages of various embodiments will be realized and attained by means of the elements and combinations particularly pointed out in the description herein.

It is to be understood that both the foregoing general description and the following detailed description are exemplary and explanatory only, and are intended to provide an explanation of various embodiments of the present teachings.

DETAILED DESCRIPTION OF THE PREFERRED EMBODIMENTS

The present teachings are directed to a differential temperature sensor system and method capable of precisely detecting a temperature shift of an optical resonator and its surroundings by determining a temperature-dependent frequency shift of a first mode and a second mode of the optical resonator.

Figure 1:
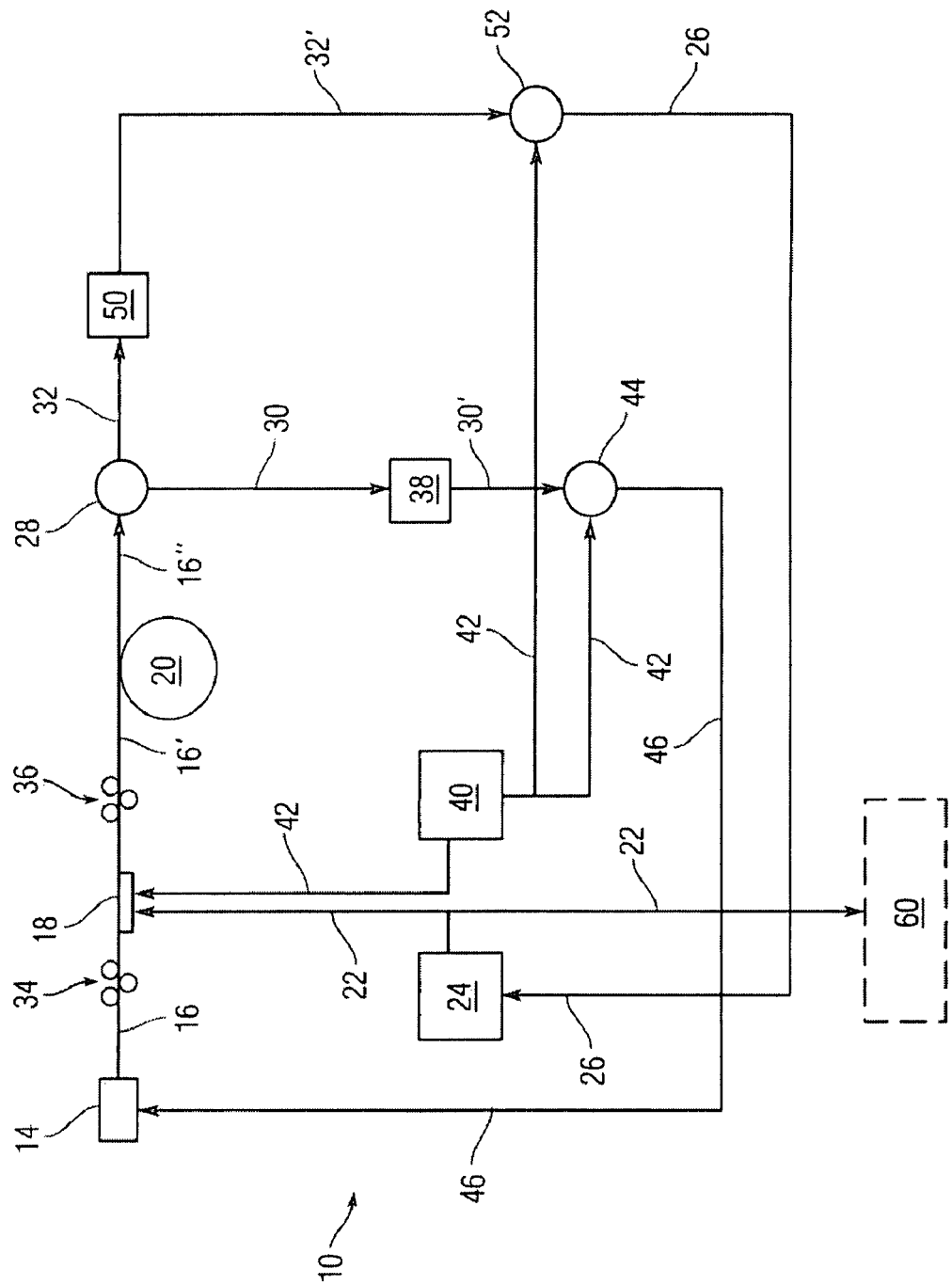
FIG. 1 is a schematic diagram of a differential temperature sensor system according to various embodiments.

In a first embodiment of the present teachings as shown in FIG. 1, a differential temperature sensor system 10 can include an optical resonator 20. The optical resonator 20 can be a whispering gallery mode resonator made of transparent birefringent media having two sets of modes with different thermo-optical constants. The two sets of modes of the optical resonator 20 can include and an ordinary mode and an extraordinary mode. The differential temperature sensor system 10 can further include an optoelectronic circuit that can compare a relative temperature dependent shift of the resonant frequencies of the optical resonator 20. As discussed further below, this frequency shift can then be used to precisely determine the temperature shift or temperature differential of the optical resonator 20 and its surroundings.

The differential temperature sensor system 10 can include a light generating device 14 that is capable of generating a beam 16 having a carrier frequency. The light generating device 14 can be, for example, a laser. The beam 16 can be directed to a modulator 18 which modulates the beam 16 based upon receipt of a radio frequency 22 generated by a tunable oscillator 24 and receipt of an oscillator frequency 42 generated by an oscillator 40. The modulator 18 can be, for example, an electro-optical modulator. The modulator 18 can be arranged in optical communication with the beam 16 and can be arranged to modulate the beam 16 with a sideband frequency thereby forming a modulated beam 16'. As a result, the modulated beam 16' has a carrier frequency and a sideband frequency. This modulated beam 16' is then directed into the optical resonator 20 which is arranged downstream from the modulator 18.

Downstream from the optical resonator 20, the optoelectronic circuit of the differential temperature sensor system 10 includes an ordinary mode-lock setup and an extraordinary mode-lock setup. The ordinary mode-lock setup is capable of locking the carrier frequency of the modulated beam 16' to the ordinary mode of the optical resonator 20 in a manner as would be appreciated by one of ordinary skill in the art. The extraordinary mode-lock setup is capable of locking the sideband frequency of the modulated beam 16' to the extraordinary mode of the optical resonator 20. By locking the carrier frequency to the ordinary mode and locking the sideband frequency to the extraordinary mode in response to a temperature change at the optical resonator 20, the differential temperature sensor system 10 is capable of determining the frequency shift of the optical resonator 20 and, in turn, the temperature shift or temperature differential at the optical resonator 20, as will be more fully discussed below.

In the extraordinary mode-lock setup, the locking of the sideband frequency of the modulated beam 16' to the extraordinary mode of the optical resonator 20 is achieved by providing the modulator 18 with a specific radio frequency 22 which is generated by the tunable oscillator 24. This specific radio frequency 22 is related to a frequency shill of the ordinary mode and the extraordinary mode of the optical resonator 20 occurring as a result of a temperature change at the optical resonator 20. As will be more fully discussed below, this frequency shift is represented by a feedback signal 26 which is directed to the tunable oscillator 24. As shown in FIG. 1, the specific radio frequency 22 can also be directed to a processor 60 which can use the value of the radio frequency 22 to precisely compute the differential temperature of the optical resonator 20 and its surroundings.

The tuning of the tunable oscillator 24 and the generation of the specific radio frequency 22 which can be used in determining the differential temperature will now be described. The tunable oscillator 24 can be arranged to receive the feedback signal 26 that is related to the extraordinary mode of the resonator 20. Based upon the value of the feedback signal 26, the tunable oscillator 24 generates the specific radio frequency 22 which has a value that locks the sideband frequency of the modulated beam 16' to the extraordinary mode of the optical resonator 20. When the feedback signal 26 changes in value as a result of a temperature change at the optical resonator 20, the tunable oscillator 24 generates a new specific radio frequency 22 that substantially corresponds to the frequency shift between the ordinary mode and the extraordinary mode of the optical resonator 20. This new specific radio frequency 22 then operates to re-lock the sideband frequency of the beam 16' to the extraordinary mode of the resonator 20. The new specific radio frequency 22 can also be directed to the processor 60 which can be arranged to precisely compute the new differential temperature of the optical resonator 20 and its surroundings.

To maximize the formation of the ordinary and extraordinary modes at the optical resonator 20, an optional adjusting polarization controller 36 can be arranged between the modulator 18 and the optical resonator 20. The adjusting polarization controller 36 is capable of polarizing the modulated beam 16' such that the polarization direction of the modulated beam 16' is angled at about 45° with respect to an axis of the optical resonator 20.

An optional fixing polarization controller 34 can be arranged between the light generating device 14 and the modulator 18. The fixing polarization controller 34 is capable of polarizing the beam 16 that is emitted from the light generating device 14.

The optional adjusting polarization controller 36 and the optional fixing polarization controller 34 operate to help i.) feed the carrier frequency of the modulated beam 16' into the ordinary mode of the resonator 20, and ii.) feed the sideband frequency of the modulated beam 16' into the extraordinary mode of the resonator 20. Accordingly, the beam 16" emitted from the optical resonator 20 can include the ordinary mode having the carrier frequency and the extraordinary mode having the sideband frequency.

A beam splitter 28 can be arranged downstream from the optical resonator 20. The beam splitter 28 operates to separate the beam 16" into an ordinary mode 30 and an extraordinary mode 32. A detector 50 can be arranged downstream from the beam splitter 28 and in optical communication with the extraordinary mode 32. The detector 50 can receive the extraordinary mode 32 and can detect a beat note and/or the intensity of the extraordinary mode 32. Depending on the beat note and/or the intensity of the extraordinary mode 32, the detector 50 emits a corresponding detector output frequency 32'.

A mixer 52 can be arranged downstream from the detector 50 and can receive the detector output frequency 32'. The mixer 52 can also be arranged to receive an oscillator frequency 42 which is generated by an oscillator 40. The mixer 52 can be a lock-in amplifier. In response to receiving the detector output frequency 32' and the oscillator frequency 42, the mixer 52 generates the feedback signal 26 which is then directed to the tunable oscillator 24. Preferably, the oscillator frequency 42 is a relatively low frequency and is a constant. As a result, the detector output frequency 32' determines the value of the feedback signal 26 which is substantially equal to the difference between the detector output frequency 32' and the constant oscillator frequency 42.

As discussed above, the tunable oscillator 24 generates the specific radio frequency 22 based upon the value of the feedback signal 26. The specific radio frequency 22 can be directed to i.) the modulator 18 to modulate the carrier frequency with a sideband frequency in order to lock the extraordinary mode of the optical resonator 20, and (ii) the processor 60 to precisely compute the differential temperature at the resonator 20 and its surroundings.

The processor 60 is capable of computing the differential temperature of the optical resonator 20 by using the equation:

$$\Delta f = \left( \frac{1}{n_0} \frac{\partial n_0}{\partial T} - \frac{1}{n_e} \frac{\partial n_e}{\partial T} \right) \cdot f_{optical} \cdot \Delta T,$$

where Δf is the frequency shift (i.e., the specific radio frequency 22), $$\frac{1}{n_e} \frac{\partial n_e}{\partial T}$$

is a constant associated with the ordinary mode 30, $$\frac{1}{n_e} \frac{\partial n_e}{\partial T}$$

is a constant associated with the extraordinary mode 32, $f_{optical}$ is the carrier frequency of the beam 16, and ΔT is the differential temperature or temperature shift.

As discussed above, the ordinary mode-lock setup locks the modulated carrier frequency to the ordinary mode of the optical resonator 20. One way to achieve this is shown in FIG. 1 where a detector 38 is arranged downstream from the beam splitter 28 and in optical communication with the ordinary mode 30. The detector 38 receives the ordinary mode 30 and detects a beat note and/or intensity of the ordinary mode 30. Depending on the beat note and/or intensity of the ordinary mode 30, the detector 38 can provide a corresponding detector output frequency 30' to a mixer 44. The mixer 44 can be a lock-in amplifier.

The mixer 44 is also arranged to receive the constant oscillator frequency 42 that is generated by the oscillator 40. In response to receiving the detector output frequency 30' and the oscillator frequency 42, the mixer 44 generates and directs a carrier frequency feedback signal 46 to the light generating device 14. Upon receiving the carrier frequency feedback signal 46, the light generating device 14 alters the carrier frequency of the emitted beam 16 in order to lock the carrier frequency of the beam 16 to the ordinary mode of the resonator 20. The carrier frequency feedback signal 46 can be substantially equal to the difference between the detector output frequency 30' and the oscillator frequency 42.

During operation of the differential temperature sensor system 10, the beam 16 emitted from the light generating device 14 is modulated to form the beam 16'. The beam 16' is then directed to the optical resonator 20 whereby the carrier frequency of the beam 16' follows the ordinary mode of the optical resonator 20 and the sideband frequency of the beam 16' follows the extraordinary mode of the optical resonator 20. The carrier frequency of the beam 16' can then be locked to the ordinary mode of the optical resonator 20 by any known ordinary mode-locking setup method, such as one described above. The sideband frequency of the beam 16' is then locked to the extraordinary mode of the optical resonator 20 by the extraordinary mode-lock setup by modulating the beam 16 with the modulator 18 as a function of the frequency shift between the ordinary mode and the extraordinary mode of the optical resonator 20.

When the temperature of the optical resonator 20 shifts, a shift in the frequency of the ordinary mode and the frequency of the extraordinary mode of the resonator 20 also occurs. In response, the ordinary mode-lock setup then re-locks the carrier frequency of the beam 16' to the new ordinary mode of the resonator 20 by generating a new carrier frequency feedback signal 46. In the extraordinary mode-lock setup, the detector 50 detects the beat note and/or intensity of the new extraordinary mode 32 and generates a new detector output frequency 32' which is directed to the mixer 52. The mixer 52 receives the constant oscillator frequency 42 and subtracts it from the new detector output frequency 32'. The difference between the oscillator frequency 42 and the new detector output frequency 32' corresponds to the new feedback signal 26 that is then directed to the tunable oscillator 24. In response, the tunable oscillator 24 generates a new specific radio frequency 22 that substantially corresponds to the frequency shift between the ordinary mode and the extraordinary mode of the resonator ordinary 20. The new radio frequency 22 is directed to the modulator 18 which re-locks the sideband frequency of the beam 16' to the extraordinary mode of the resonator 20. The processor 60 can also receive the new radio frequency 22 and precisely computes the temperature shift or temperature differential of the optical resonator 20 using the equation previously set forth above. The differential temperature sensor system 10 can be incorporated as part of a laser frequency stabilization arrangement.

Figure 2:
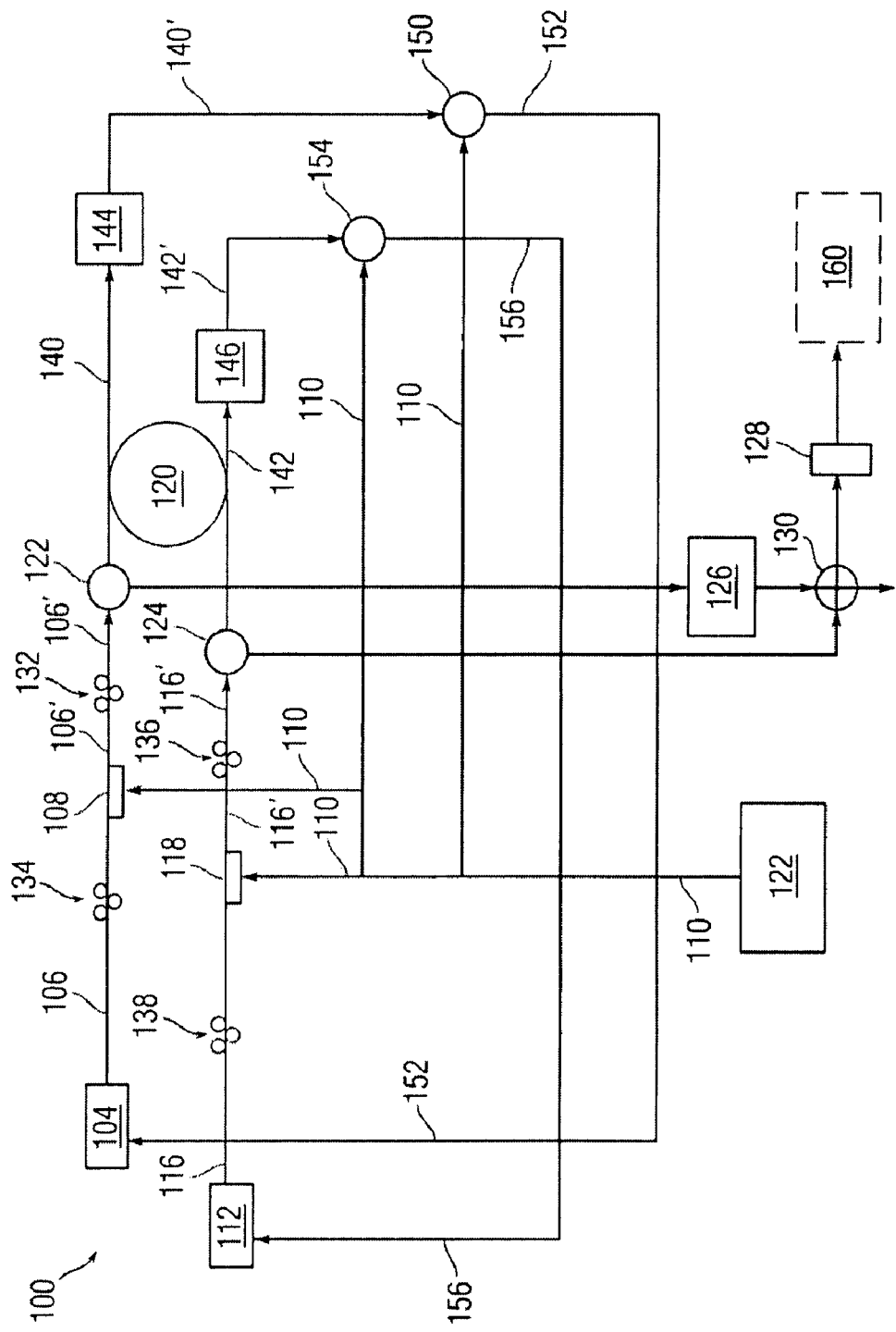
FIG. 2 is a schematic diagram of another differential temperature sensor system according to various embodiments.

In a second embodiment of the present teachings as shown in FIG. 2, a differential temperature sensor system 100 includes a first light generating device 104, a second light generating device 112, and an optical resonator 120. In contrast to the first embodiment, the second embodiment forms two independent beams each having a different carrier frequency, $f_0$ and $2f_0+\Delta f$, instead of utilizing a single beam having both a carrier frequency and a sideband frequency.

The first light generating device 104 of the differential temperature sensor system 100 can include a laser that is capable of generating a beam 106 having the frequency $f_0$. The beam 106 can be directed to a modulator 108 that is driven by an oscillator frequency 110 from an oscillator 122. The modulator 108 can be, for example, an electro-optical modulator. The modulator 108 can be arranged in optical communication with the beam 106 to modulate the beam 106 with a sideband frequency thereby forming a beam 106'.

The second light generating device 112 of the differential temperature sensor 100 can include a laser 112 that is capable of generating a beam 116 having the frequency $2f_0+\Delta f$. The beam 116 can be directed to a modulator 118 that is also driven by the oscillator frequency 110 from oscillator 122. The modulator 118 can be, for example, an electro-optical modulator. The modulator 118 can be arranged in optical communication with the beam 116 to modulate the beam 116 with a sideband frequency thereby forming a beam 116'.

An optical resonator 120 of the differential temperature sensor 100 can be a whispering gallery mode resonator having two sets of modes with different thermo-optical constants. The two sets of modes of the optical resonator 120 can include and a first mode and a second mode. The optical resonator 120 can be made of transparent birefringent material, but other non-birefringent materials can also be used. The optical resonator 120 can be arranged in optical communication with the beams 106' and 116'.

The differential temperature sensor system 100 also includes a first mode-lock setup and a second mode-lock setup. The first mode-lock setup is arranged to lock the frequency of the beam 106' to the first mode of the resonator 120 in a manner as would be appreciated by one of ordinary skill in the art. The second mode-lock setup is arranged to lock the frequency $2f_0+\Delta f$ of the beam 116' to the second mode of the resonator 120 in a manner as would also be appreciated by one of ordinary skill in the art. A portion of each of the locked frequencies, $f_0$ and $2f_0+\Delta f$, can be directed to a combiner 130 that is arranged to generate a frequency corresponding to a frequency shift $\Delta f$. The frequency shift $\Delta f$ substantially corresponds to a frequency shift between the first mode and the second mode of the optical resonator 120 which occurs as a result of a temperature change at the optical resonator 120. A processor 160 can be arranged to receive a signal corresponding to the frequency shift $\Delta f$ from the combiner 130 and to compute the differential temperature of optical resonator 120 and its surroundings.

The combiner 130 can be arranged in communication with a beam splitter 124 which is arranged to split the beam 116'. The beam splitter 124 directs a portion of the beam 116' having locked frequency $2f_0+\Delta f$ to the combiner 130 and another portion of that beam 116' to the optical resonator 120.

The combiner 130 is also in communication with a beam splitter 122 which is arranged to split the beam 106'. The beam splitter 122 directs a portion of the beam 106' having locked frequency $f_0$ to the combiner 130 and another portion of that beam 106' to the optical resonator 120.

An optional multiplier 126 can be arranged between the beam splitter 122 and the combiner 130. The multiplier 126 can be arranged to magnify the frequency of the locked frequency $f_0$ prior to introducing it to the combiner 130. The multiplier 126 can be arranged to double the locked frequency to (i.e., to $2f_0$) and then provide this doubled frequency $2f_0$ to the combiner 130. In response, the combiner 130 can generate a signal corresponding to the output frequency shift $\Delta f$ by subtracting the received locked frequency $2f_0+\Delta f$ of the beam 116' from the received locked doubled frequency $2f_0$. Therefore, the combiner 130 is arranged to perform the following calculation: $((2f_0+\Delta f)-2f_0)=\Delta f$.

The signal corresponding to the frequency shift $\Delta f$ can then be directed to a detector 128 which detects the signal. The detector 128 can be arranged between the combiner 130 and the processor 160. In response to detecting the output frequency shift $\Delta f$, the detector 128 forwards the signal to the processor 160. The processor 160 can be arranged to compute the differential temperature of the optical resonator 120 by using the equation $$\Delta f = \left( \frac{1}{n_{f_0}} \frac{\partial n_{fe}}{\partial T} - \frac{1}{n_{2fe}} \frac{\partial n_{2fe}}{\partial T} \right) \cdot 2f_0 \cdot \Delta T,$$

where $\Delta f$ is the frequency shift, $$\frac{1}{n_{f_0}} \frac{\partial n_{f_0}}{\partial T}$$

is a first constant, $$\frac{1}{n_{2f_0}} \frac{\partial n_{2f_0}}{\partial T}$$

is a second constant, $2f_0$, is the frequency of the beam 106' after it has been doubled by the multiplier 126, and $\Delta T$ is the temperature shift or differential temperature.

in order to lock the frequency $f_0$ of the beam 106' to the first mode of the resonator 120 and to lock the frequency $2f_0+\Delta f$ of the beam 116' to the second mode of the resonator 120, each of the beams 106' and 116' are first introduced into the optical resonator 120.

To more effectively introduce the beam 106' into the optical resonator 120, an adjusting polarization controller 132 can be arranged between the modulator 108 and the optical resonator 120. The adjusting polarization controller 132 can be arranged to polarize the beam 106'. A fixing polarization controller 134 can be arranged between the first light generating device 104 and the modulator 108. The fixing polarization controller 134 can be arranged to polarize the beam 106.

In a similar manner, to more effectively introduce the beam 116' into the optical resonator 120, an adjusting polarization controller 136 can be arranged between the modulator 118 and the optical resonator 120. The adjusting polarization controller 136 can be arranged to polarize the beam 116'. A fixing polarization controller 138 can be arranged between the second light generating device 112 and the modulator 118. The fixing polarization controller 138 can be arranged to polarize the beam 116.

In the differential temperature sensor system 100, the beam 106' having frequency $f_0$ is directed into the first mode of the optical resonator 120 and the beam 116' having frequency $2f_0+\Delta f$ is fed into the second mode of the optical resonator 120. As a result, the optical resonator 120 includes a first output mode 140 having frequency $f_0$ and a second output mode 142 having frequency $2f_0+\Delta f$.

The first output mode 140 can then be directed to a detector 144 arranged downstream from the optical resonator 120. The detector 144 can detect a beat note and/or an intensity of the first output mode 140 and emits a corresponding detector output frequency 140' to a mixer 150. The mixer 150 can be a lock-in amplifier.

The mixer 150 is arranged to additionally receive the oscillator frequency 110 that is generated by the oscillator 122. In response to receiving both the detector output frequency 140' and the oscillator frequency 110, the mixer 150 generates and provides a feedback signal 152 to the first light generating device 104 which operates to lock the frequency $f_0$, of beam 106' to the first mode of the optical resonator 120. The feedback signal 152 can be substantially equal to the difference between the detector output frequency 140' and the oscillator frequency 110.

In a similar manner, the second output mode 142 can be directed to a detector 146 arranged downstream from the optical resonator 120. The detector 146 can detect a beat note and/or an intensity of the second output mode 142 and emits a corresponding detector output frequency 142' to a mixer 154. The mixer 154 can be a lock-in amplifier.

The mixer 154 also receives the oscillator frequency 110 that is generated by the oscillator 122. In response to receiving both the detector output frequency 142' and the oscillator frequency 110, the mixer 154 can generate and provide a feedback signal 156 to the second light generating device 112 which operates to lock the frequency $2f_0+\Delta f$ of beam 116' to the second mode of the optical resonator 120. Preferably, the feedback signal 156 is substantially equal to the difference between the detector output frequency 142' and the oscillator frequency 110.

During operation of the differential temperature sensor system 100, the beams 106 and 116 are modulated and form beams 106' and 116', respectively. The beams 106' and 116' are then directed to the optical resonator 120, whereby the beam 106' having frequency $f_0$ follows the first mode of the optical resonator 120 and the beam 116' having frequency $2f_0+\Delta f$ follows the second mode of the optical resonator 120. The frequency $f_0$ is locked to the first mode of the optical resonator 120 and the frequency $2f_0+\Delta f$ is locked to the second mode of the optical resonator 120 by any known mode-locking setup method, such as one described above. The locked frequencies are then provided to the combiner 130 that is arranged to generate a frequency corresponding to a frequency shift $\Delta f$.

When the temperature of the optical resonator 120 shifts, a shift in the frequency of the first mode and the frequency of the second mode of the optical resonator 120 also occurs. As a result, the first mode-lock setup re-locks the frequency $1'_0$ of beam 106' to the new first mode of the resonator 120 and the second mode-lock setup re-locks the frequency $2f_0+\Delta f$ of beam 116' to the new second mode of the resonator 120. The re-locked frequencies are then provided to the combiner 130 that is arranged to generate a new signal corresponding to the frequency shift $\Delta f$. The new frequency shift $\Delta f$ is then provided to the processor 160 that is capable of precisely computing the temperature shift or temperature differential of the optical resonator 120 and its surroundings using the equation previously set forth above. The differential temperature sensor system 100 can be incorporated as part of a laser frequency stabilization arrangement.

Those skilled in the art can appreciate from the foregoing description that the present teachings can be implemented in a variety of forms. Therefore, while these teachings have been described in connection with particular embodiments and examples thereof, the true scope of the present teachings should not be so limited. Various changes and modifications may be made without departing from the scope of the teachings herein.

What is claimed is:

1. A differential temperature sensor system comprising:
   a light generating device capable of generating a beam having a carrier frequency;
   a modulator being driven by a radio frequency and arranged in optical communication with the beam such that the modulator is capable of modulating the beam with a sideband frequency;
   an optical resonator capable of supporting ordinary and extraordinary modes and arranged in optical communication with the beam downstream from the modulator;
   an ordinary mode-lock setup capable of locking the carrier frequency of the beam to the ordinary mode of the optical resonator;
   an extraordinary mode-lock setup capable of locking the sideband frequency of the beam to the extraordinary mode of the optical resonator by providing a specific radio frequency to the modulator substantially corresponding to a frequency shift between the ordinary mode and the extraordinary mode of the optical resonator resulting from a temperature change of the optical resonator; and
   a processor arranged to receive the specific radio frequency and capable of calculating the differential temperature of the optical resonator based upon the frequency shift between the ordinary mode and extraordinary mode of the optical resonator.

2. The differential temperature sensor system of claim 1, wherein the extraordinary mode-lock setup comprises a tunable oscillator.

3. The differential temperature sensor system of claim 2, wherein the tunable oscillator is arranged to receive a feedback signal related to the extraordinary mode of the optical resonator and is capable of providing various specific radio frequencies based upon the feedback signal.

4. The differential temperature sensor system of claim 3, wherein the tunable oscillator provides a new specific radio frequency corresponding to a further frequency shift between the ordinary mode of the optical resonator and the extraordinary mode of the optical resonator when the feedback signal changes as a result of a further temperature change.

5. The differential temperature sensor system of claim 1, wherein the optical resonator is fabricated of a transparent birefringent media.

6. The differential temperature sensor system of claim 5, further comprising an adjusting polarization controller capable of polarizing the beam downstream from the modulator.

7. The differential temperature sensor system of claim 5, further comprising a fixing polarization controller capable of polarizing the beam and arranged between the light generating device and the modulator.

8. The differential temperature sensor system of claim 1, wherein the light generating device is a laser.

9. The differential temperature sensor system of claim 1, wherein the modulator is an electro-optical modulator.

10. The differential temperature sensor system of claim 1, further comprising a beam splitter arranged downstream from the optical resonator and capable of separating the ordinary mode of the optical resonator from the extraordinary mode of the optical resonator.

11. A differential temperature sensor system comprising:
- a light generating device capable of generating a beam having a carrier frequency;
- a tunable oscillator capable of emitting a signal including a specific radio frequency;
- a modulator being driven by the specific radio frequency of the tunable oscillator and arranged in optical communication with the beam such that the modulator is capable of modulating the beam with a sideband frequency;
- an optical resonator capable of supporting ordinary and extraordinary modes which shift in response to a temperature change, the optical resonator being arranged in optical communication with the beam downstream from the modulator;
- a mode-lock setup capable of locking the carrier frequency of the beam to the ordinary mode of the optical resonator; and
- a processor arranged to receive the signal from the tunable oscillator;
- wherein the tunable oscillator is arranged to receive a feedback signal related to the sideband frequency and to drive the modulator by the specific radio frequency corresponding to a frequency shift between the ordinary mode and extraordinary mode of the optical resonator resulting from a temperature change of the optical resonator when the sideband frequency is locked to the extraordinary mode of the optical resonator; and
- wherein the processor is arranged to calculate the temperature differential at the optical resonator based upon the frequency shift between the ordinary mode and extraordinary mode of the optical resonator.

12. The differential temperature sensor system of claim 11, wherein the tunable oscillator provides a new specific radio frequency corresponding to a further frequency shift between the ordinary mode of the optical resonator and the extraordinary mode of the optical resonator when the feedback signal changes as a result of a further temperature change.

13. The differential temperature sensor system of claim 11, further comprising an adjusting polarization controller capable of polarizing the beam downstream from the modulator.

14. The differential temperature sensor system of claim 11, further comprising a fixing polarization controller capable of polarizing the beam and arranged between the light generating device and the modulator.

15. The differential temperature sensor system of claim 11, further comprising a beam splitter arranged downstream from the optical resonator and capable of separating the ordinary mode of the optical resonator from the extraordinary mode of the resonator.

* * * * *